United States Patent
Nakagawa et al.

(10) Patent No.: US 7,911,686 B2
(45) Date of Patent: *Mar. 22, 2011

(54) OPTICAL MODULE AND OPTICAL COMMUNICATION SYSTEM

(75) Inventors: Shigeru Nakagawa, Tokyo (JP); Haruhisa Soda, Tokyo (JP)

(73) Assignee: FiBest, Ltd., Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 10/713,777

(22) Filed: Nov. 13, 2003

(65) Prior Publication Data

US 2005/0052726 A1 Mar. 10, 2005

(30) Foreign Application Priority Data

Aug. 14, 2003 (JP) .................. 2003-207575

(51) Int. Cl.
*H01S 5/00* (2006.01)
*G02F 1/035* (2006.01)
*G02F 1/015* (2006.01)

(52) U.S. Cl. ........ 359/344; 359/321; 359/322; 359/237; 359/245

(58) Field of Classification Search .................. 359/344
See application file for complete search history.

(56) References Cited

U.S. PATENT DOCUMENTS

| | | | | |
|---|---|---|---|---|
| 4,008,947 A | * | 2/1977 | Baues et al. ........................ 385/9 |
| 4,201,442 A | * | 5/1980 | McMahon et al. ............... 385/17 |
| 4,761,060 A | * | 8/1988 | Sawano ......................... 359/243 |
| 4,923,267 A | * | 5/1990 | Su .................................... 385/16 |
| 4,954,786 A | * | 9/1990 | Yamakawa et al. ...... 359/341.41 |
| 5,002,354 A | * | 3/1991 | Koai ............................... 385/21 |
| 5,004,447 A | | 4/1991 | Soref |
| 5,044,745 A | * | 9/1991 | Inoue et al. ....................... 385/16 |
| 5,394,489 A | * | 2/1995 | Koch ............................... 385/14 |
| 5,394,491 A | * | 2/1995 | Inoue et al. ...................... 385/16 |
| 5,452,383 A | * | 9/1995 | Takiguchi ........................ 385/16 |
| 5,453,874 A | * | 9/1995 | Ono et al. ...................... 359/344 |
| 5,515,192 A | * | 5/1996 | Watanabe ..................... 398/198 |
| 5,521,751 A | * | 5/1996 | Aida et al. ..................... 359/337 |
| 5,568,311 A | * | 10/1996 | Matsumoto ................... 359/344 |
| 5,604,628 A | * | 2/1997 | Parker et al. .................. 359/344 |
| 5,657,148 A | * | 8/1997 | Feuer et al. ................... 359/263 |

(Continued)

FOREIGN PATENT DOCUMENTS

EP 0455347 11/1991

(Continued)

OTHER PUBLICATIONS

Glastere G. et al. "Monolithic Integration of 2X Switch and Optical Amplifier with O DB Fibre to Fibre Insertion Loss Grown by LP-MOCDVD" Electronics Letters, IEE Stevenage, GB, vol. 29, No. 1, pp. 124-126, Jan. 7, 1993.

(Continued)

*Primary Examiner* — Eric Bolda
(74) *Attorney, Agent, or Firm* — Townsend and Townsend and Crew LLP; Kenneth R. Allen

(57) ABSTRACT

An optical module, which is arranged in an optical transmission path, includes an optical amplifying unit configured with a semiconductor, wherein the optical amplifying unit amplifies light input from the optical transmission path, and an optical element configured with a semiconductor, wherein the optical element propagates the light amplified by the optical amplifying unit to the optical transmission path.

20 Claims, 20 Drawing Sheets

U.S. PATENT DOCUMENTS

| | | | | |
|---|---|---|---|---|
| 5,710,847 | A * | 1/1998 | Takano et al. | 385/28 |
| 5,796,768 | A * | 8/1998 | Mersali et al. | 372/45.01 |
| 5,859,611 | A * | 1/1999 | Lam et al. | 342/368 |
| 6,078,417 | A * | 6/2000 | Perino et al. | 398/157 |
| 6,108,125 | A * | 8/2000 | Yano | 359/344 |
| 6,215,585 | B1 * | 4/2001 | Yoshimura et al. | 359/344 |
| 6,603,599 | B1 * | 8/2003 | Wang et al. | 359/344 |
| 6,624,929 | B2 * | 9/2003 | Kang et al. | 359/344 |
| 6,836,573 | B2 * | 12/2004 | Soda | 385/2 |
| 6,973,238 | B2 * | 12/2005 | Soda et al. | 385/41 |
| 7,005,669 | B1 * | 2/2006 | Lee | 257/21 |
| 2001/0036009 | A1 * | 11/2001 | Li et al. | 359/344 |
| 2001/0043390 | A1 * | 11/2001 | Kim et al. | 359/344 |
| 2002/0076133 | A1 * | 6/2002 | Li et al. | 385/16 |
| 2002/0154392 | A1 * | 10/2002 | Dorgeuille et al. | 359/344 |
| 2002/0159705 | A1 * | 10/2002 | Naniwae | 385/49 |
| 2003/0160148 | A1 * | 8/2003 | Yao et al. | 250/205 |
| 2003/0174393 | A1 * | 9/2003 | Maeda et al. | 359/344 |
| 2004/0047529 | A1 * | 3/2004 | Soda | 385/2 |
| 2004/0081389 | A1 * | 4/2004 | Soda et al. | 385/16 |
| 2005/0025414 | A1 * | 2/2005 | Kamiyama et al. | 385/27 |

FOREIGN PATENT DOCUMENTS

| | | |
|---|---|---|
| EP | 494751 A2 * | 7/1992 |
| EP | 517499 A2 * | 12/1992 |
| EP | 0857996 | 8/1998 |
| JP | 64-006921 | 1/1989 |
| JP | 05-142590 | 6/1993 |
| JP | 10-228037 | 8/1998 |
| JP | 2002-116419 | 4/2002 |
| JP | 2003-163406 | 6/2003 |

OTHER PUBLICATIONS

Kohtoku m et al. "High-Speed Ingaalas-Inalas MQW Directional Coupler Waveguide Switchmodules Integrated With A Spotsize Converter Having a Lateral Taper, Thin-Film Core, and Ridge" Journal of Lightwave Technology, IEEE, New York, US. vol. 18, No. 3, pp. 360-369 Mar. 2000.

Nagai S et al. "Ingaasp/Inp Multi-Mode Inteference Photonic Switches for Monolithic Photonic Integrated Circuits" Japanese Journal of Applied Physics, Publication Office Japanese Journal of Applied Physics. Tokyo, Japan vol. 38, No. 2B Part 1, pp. 1269-1272, Feb. 1999.

Office Action and English Translation for Japanese Application No. 2003-207575, mailed on Mar. 2, 2010, 6 pages total.

* cited by examiner

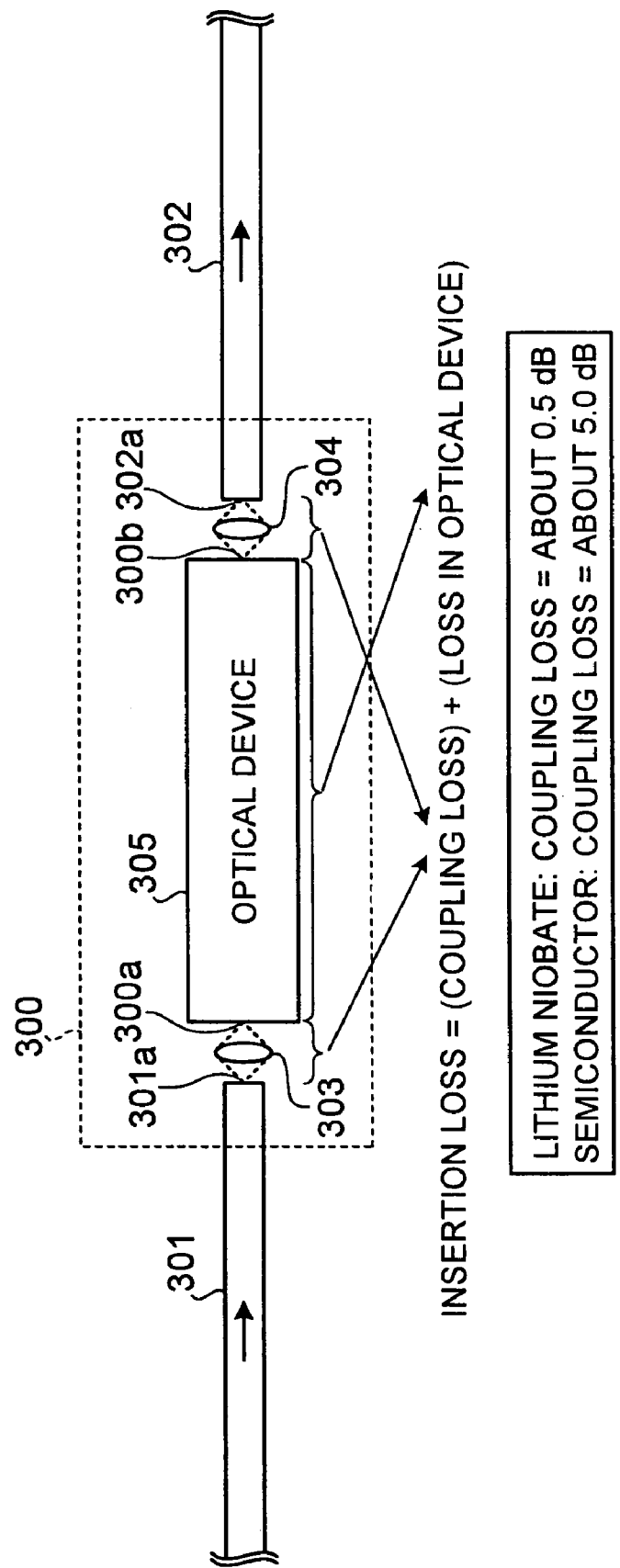

OPTICAL MODULE AND OPTICAL COMMUNICATION SYSTEM

BACKGROUND OF THE INVENTION

1) Field of the Invention

The present invention relates to an optical module and an optical communication system that can reduce an insertion loss in an optical transmission path.

2) Description of the Related Art

A conventional technology has been disclosed in, for example, Japanese Patent Application Laid-open No. 2003-163406. FIG. 20 illustrates how a conventional optical module 300 is mounted. Precisely, the optical module 300 is arranged between optical fibers 301 and 302. The optical module 300 includes lenses 303 and 304, an optical device 305, end portions of the optical fibers 301 and 302. The optical device 305 may be an optical modulator, an optical switch, or a directional optical coupler, having an optical waveguide.

The optical fiber 301 guides light to the optical device 305. Thus, the optical fiber 301 is provided on the "input side". An output plane 301a of the optical fiber 301 is optically coupled with an input plane 300a of the optical device 305 via the lens 303.

The optical fiber 302 guides light away (or outputs) from the optical device 305. Thus, the optical fiber 302 is provided on the "output side". An input plane 302a of the optical fiber 302 is optically coupled with an output plane 300b of the optical device 305 via the lens 304.

The light output from the output plane 301a of the optical fiber 301 is collected by the lens 303 and input to the input plane 300a of the optical device 305, and propagates in the optical waveguide (not shown) in the optical device 305.

The light output from the output plane 300b of the optical device 305 is collected by the lens 304 and input to the input plane 302a of the optical fiber 302, and propagates in the optical fiber 302.

The insertion loss when the optical module 300 is inserted between the optical fiber 301 and the optical fiber 302 is expressed by the following equation (1):

Insertion loss=(coupling loss)+(loss in optical device)     (1).

In equation (1), the coupling loss stands for a sum of a loss accompanying optical coupling between the output plane 301a of the optical fiber 301 and the input plane 300a of the optical device 305, and a loss accompanying optical coupling between the output plane 300b of the optical device 305 and the input plane 302a of the optical fiber 302. The loss in optical device stands for a loss when the light propagates in the optical device 305.

Conventionally, the optical device 305 is made from lithium niobate. Lithium niobate has an advantage in that the coupling loss is as low as about 0.5 decibel, though increasing the size of the optical device 305, as compared with an optical device comprising a semiconductor.

The insertion loss of the lithium niobate optical device 305 is a sum of the coupling loss (about 0.5 decibel) and a loss in the optical device (about 0.5 decibel), which is about 1.0 decibel.

Recently, the optical device 305 is made from a semiconductor, instead of lithium niobate, in response to demands for a small and thin optical module 300 (optical device 305).

It is advantageous to use the semiconductor in that the optical device 305 (optical module 300) can be made small and thin, as compared with the lithium niobate optical device, but has a disadvantage in that the coupling loss reaches about 5.0 decibels. When the optical device 305 is made from the semiconductor, the insertion loss of the optical module 300 is a sum of the coupling loss (about 5.0 decibels) and the loss in the optical device (about 0.5 decibel), which reaches about 5.5 decibels.

In other words, if the optical device 305 is made of a semiconductor, there is a problem in that the insertion loss increases by about 5.0 decibels. The reason being, as the size becomes small, the optical mode size in the optical waveguide of the optical device 305 becomes smaller than that of the lithium niobate optical device, and hence a loss at the time of optical coupling increases.

The optical mode size refers to a half of the width when an electric field reaches the maximum value, 1/e, if it is assumed that the electric field distribution in the optical waveguide (including the optical fiber) is Gaussian.

SUMMARY OF THE INVENTION

It is an object of the present invention to solve at least the problems in the conventional technology.

An optical module, which is arranged in an optical transmission path, according to one aspect of the present invention includes an optical amplifying unit configured with a semiconductor, wherein the optical amplifying unit amplifies light input from the optical transmission path; and an optical element configured with a semiconductor, wherein the optical element propagates the light amplified by the optical amplifying unit to the optical transmission path.

An optical communication system according to another aspect of the present invention includes the optical module according to the above-mentioned aspect.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 20 illustrates a conventional optical module.

DETAILED DESCRIPTION

Exemplary embodiments of the optical module and the optical communication system according to the present invention will be explained in detail, with reference to the drawings.

Figure 1:
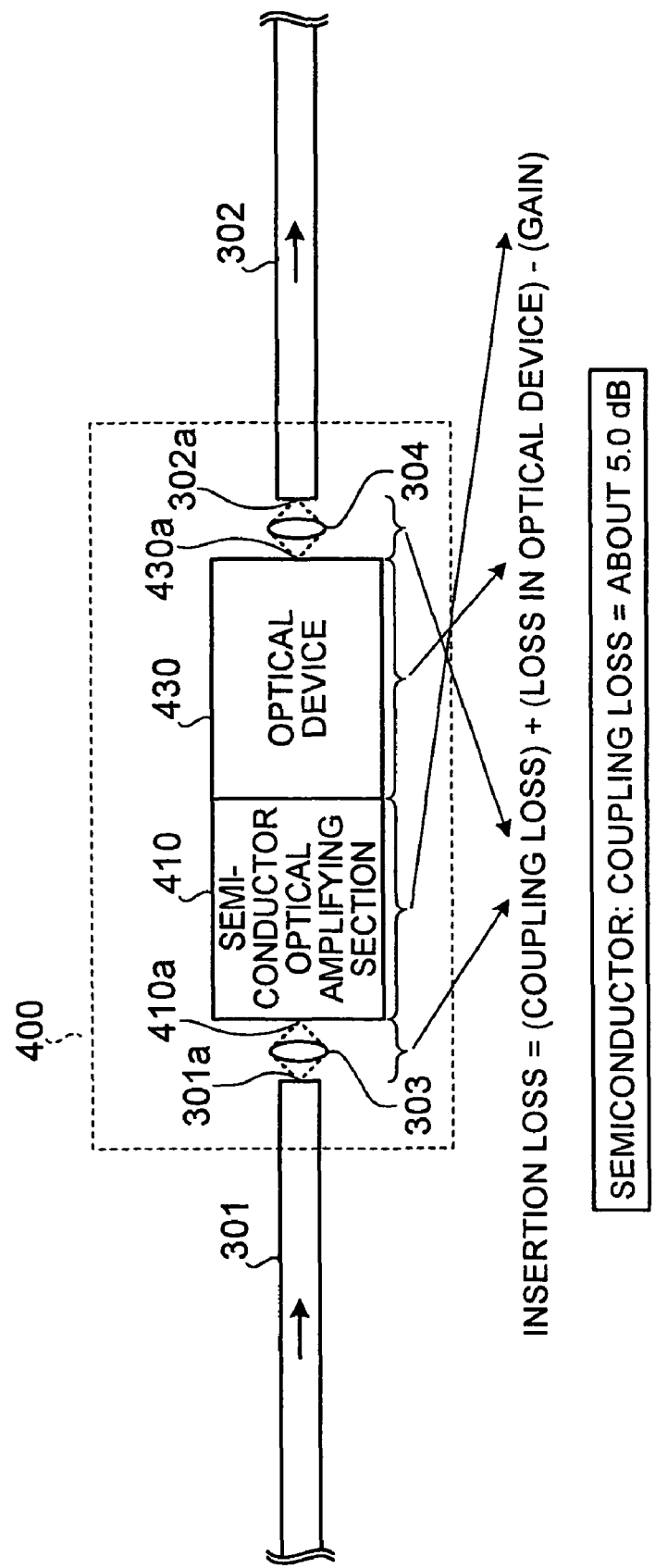
FIG. 1 illustrates an optical communication system according to a first embodiment of the present invention.

FIG. 1 illustrates an optical communication system according to a first embodiment of the present invention. In this figure, those parts that perform same or similar functions or have same or similar configuration as the parts shown in FIG. 20 have been provided with like reference signs. Thus, the optical communication system according to a first embodiment is different from the conventional optical communication system shown in FIG. 20 in that it includes an optical module 400 instead of the optical module 300.

The optical module 400 is arranged between the optical fiber 301 and the optical fiber 302. The optical module 400 includes a semiconductor optical amplifying section 410, an optical device 430, the lenses 303 and 304, the end portions of the optical fibers 301 and 302. The semiconductor optical amplifying section 410 is provided on the input side and it amplifies light input to the input plane 410a from the output plane 301a of the optical fiber 301 via the lens 303. The semiconductor optical amplifying section 410 is capable of changing the gain, for example, anywhere between 0 and 15 decibels or even more. For example, when it is assumed that the gain of the semiconductor optical amplifying section 410 is about 5.5 decibels, the insertion loss of the optical module 400 (about 5.5 decibels) can be compensated.

Figure 2:
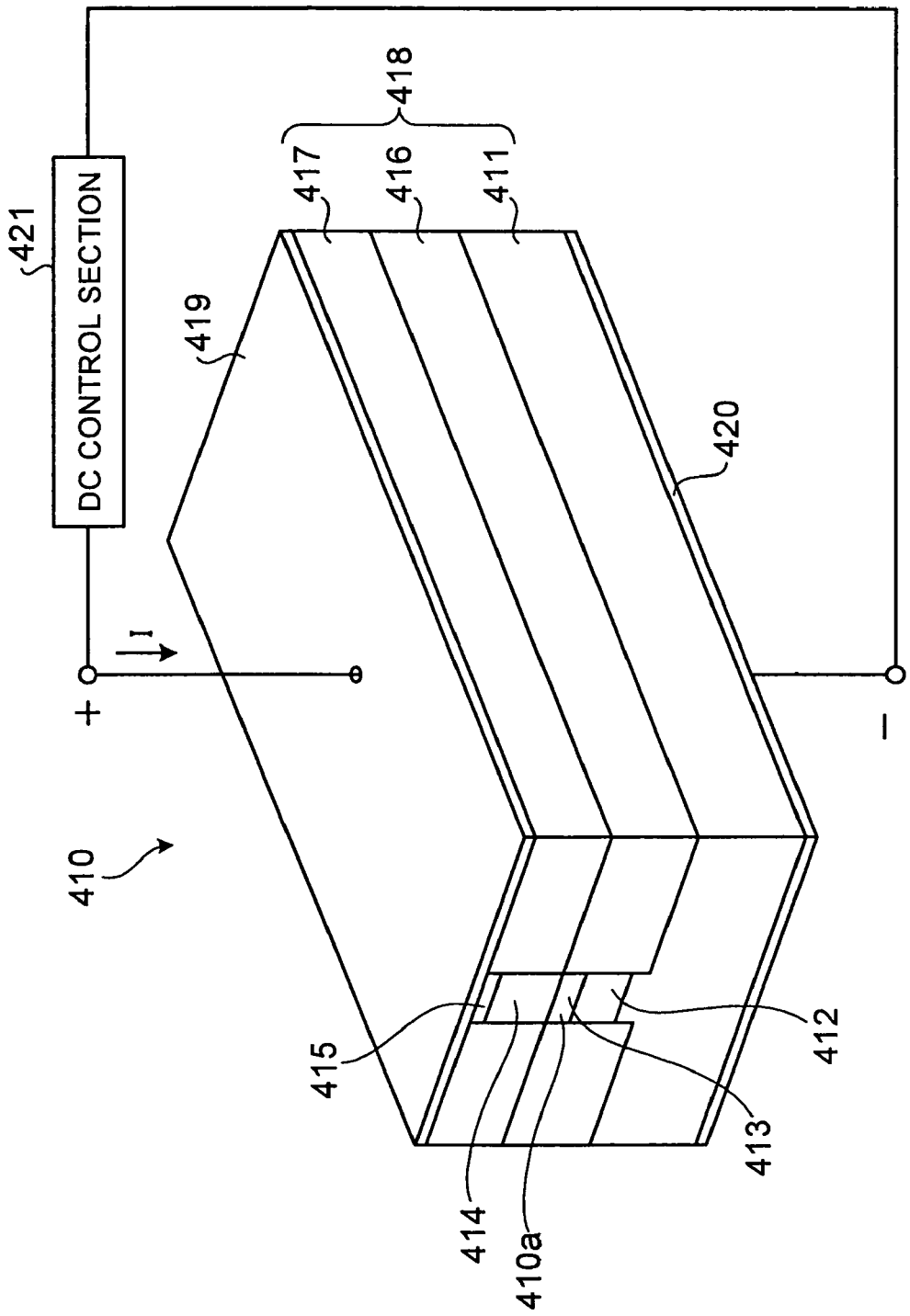
FIG. 2 is a perspective of a semiconductor optical amplifying section.

FIG. 2 is a perspective of the semiconductor optical amplifying section 410 shown in FIG. 1. In this semiconductor optical amplifying section 410, an InP(n) lower cladding layer 412 is formed on an InP(n+) substrate 411.

An active layer 413 having a substantially rectangular section is formed on the lower cladding layer 412. The semiconductor optical amplifying section 410, which is formed so as to cover the active layer 413, has a laminated structure comprising an InP(p) upper cladding layer 414, a contact layer 415, an InP(p) buried layer 416, and an InP(n) buried layer 417.

An upper electrode 419 is formed on the upper face of the laminated body 418. On the other hand, a lower electrode 420 is formed on the bottom face of the laminated body 418. The DC control section 421 is connected to the upper electrode 419 and the lower electrode 420, for injecting a DC current I in the forward direction from the upper electrode 419.

Referring again to FIG. 1, the optical device 430 is an optical modulator, an optical switch, or a directional optical coupler, having an optical waveguide, and is provided on the output side of the optical module 400. The light amplified by the semiconductor optical amplifying section 410 is input to the optical device 430. Further, the light output from the output plane 430a of the optical device 430 is input to the input plane 302a of the optical fiber 302.

The semiconductor optical amplifying section 410 and the optical device 430 both comprise a semiconductor, and constitute the optical module 400.

The light output from the output plane 301a of the optical fiber 301 is collected by the lens 303, and input to the input plane 410a of the semiconductor optical amplifying section 410. As a result, since the DC current in the forward direction is injected from the DC control section 421 shown in FIG. 2, the light input to the input plane 410a is amplified while propagating through the active layer 413 of the semiconductor optical amplifying section 410, and input to the optical device 430 shown in FIG. 1.

The configuration of an optical shutter may be used, in which a DC current I in the reverse direction (or a DC current I in the forward direction and not larger than a predetermined value) is injected by the DC control section 421, to attenuate the light propagating through the active layer 413.

The light propagates in the optical waveguide (not shown) of the optical device 430, and after being output from the output plane 430a, is collected by the lens 304 and input to the input plane 302a of the optical fiber 302, and propagates in the optical fiber 302.

The insertion loss when the optical module 400 is inserted between the optical fiber 301 and the optical fiber 302 is expressed by the following equation (2):

Insertion loss=(coupling loss)+(loss in optical device)−(gain)     (2).

In equation (2), the coupling loss stands for a sum of a loss accompanying optical coupling between the output plane 301a of the optical fiber 301 and the input plane 410a of the semiconductor optical amplifying section 410, and a loss accompanying optical coupling between the output plane 430a of the optical device 430 and the input plane 302a of the optical fiber 302, and is about 5.0 decibels. The loss in optical device stands for a loss when the light propagates in the optical device 430, and is about 0.5 decibel. The gain stands for optical amplification gain in the semiconductor optical amplifying section 410, and is changed in a range of from 0 to 15 decibels or even more.

When it is assumed that the gain of the semiconductor optical amplifying section 410 is 5.5 decibels, the insertion loss becomes about 0 decibel ((about 5.0 decibels)+(about 0.5 decibel)−(about 5.5 decibels)). That is, the insertion loss is completely compensated. Further, by making the gain of the semiconductor optical amplifying section 410 higher than 5.5 decibels, a gain of not smaller than several decibels in total of the optical module 400 can be obtained.

Specific examples of the optical device 430 shown in FIG. 1 will be explained with reference to FIGS. 3 to 16.

Figure 3:
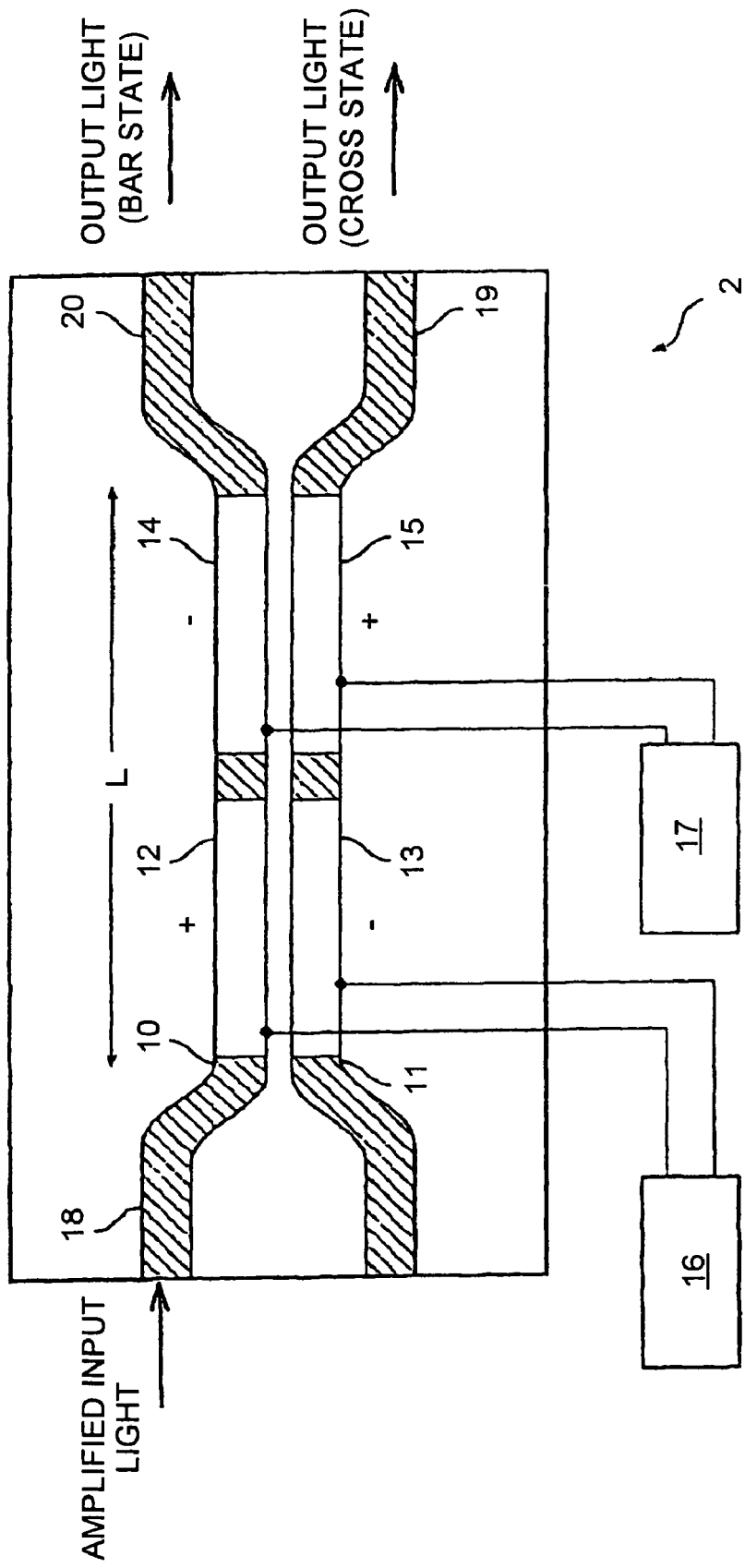
FIG. 3 is a plan view of a reverse delta beta type directional coupler modulator.

FIG. 3 is a plan view of a reverse delta beta type directional coupler modulator 2 as a specific example of the optical device 430. In the reverse delta beta type directional coupler modulator 2, the incident light amplified by the semiconductor optical amplifying section 410 is input to the optical waveguide 18.

The delta-beta type directional coupler modulator 2 includes a pair of waveguides 10, 11 having mutually parallel electrodes 12, 13, 14, 15 in sufficient proximity for delta-beta switched directional coupling. To operate such a device, two electrical modulation signals from sources 16, 17 with opposite signs are required.

For L larger than the coupling length of the directional coupler and shorter than three times the coupling length, cross state and bar state are obtained for specific applied voltages Vc and Vb.

In the cross state, when the bias voltage is Vc, the input light (optical radiation) of upper waveguide 18 is split into an upper and lower waveguides 10 and 11 at the end of what is the first directional coupler with 50% of input power distributed to each. Then by the reciprocity of reverse delta-beta type directional coupler modulator, the output light (optical radiation) comes out from only the lower waveguide 19 at the end of what is the second directional coupler.

In the bar state, when the bias voltage is Vb, the input light of an upper waveguide 18 propagates only to the upper waveguide 20 at the end of the second directional coupler because of a larger phase mismatch. Accordingly both cross and bar state can be controlled completely by signal voltages with a wide fabrication tolerance of the structural parameters.

Figure 4:
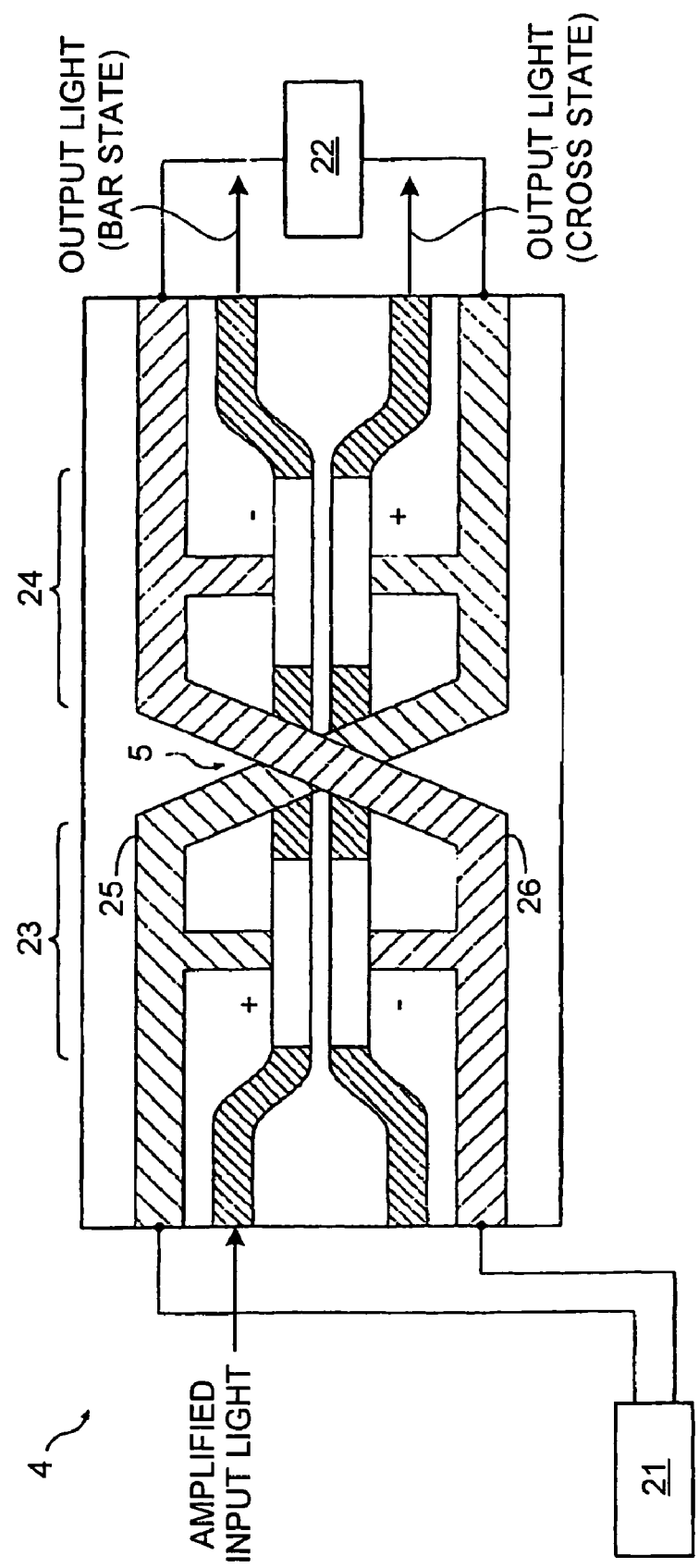
FIG. 4 is a plan view of another reverse delta beta type directional coupler modulator.

FIG. 4 is a plan view of a reverse delta beta type directional coupler modulator 4 as another specific example of the optical device 430. The modulation signal is supplied by one signal generator 21, and terminates at the load 22.

In order to apply opposite sign signals for a first directional coupler 23 and a second 24 directional coupler, the traveling-wave electrodes 25, 26 must be bent and crossed at the center 5 as shown in FIG. 2. It is also strongly desired to completely isolate the first and second directional coupler electrically to obtain efficient phase mismatches.

Figure 5:
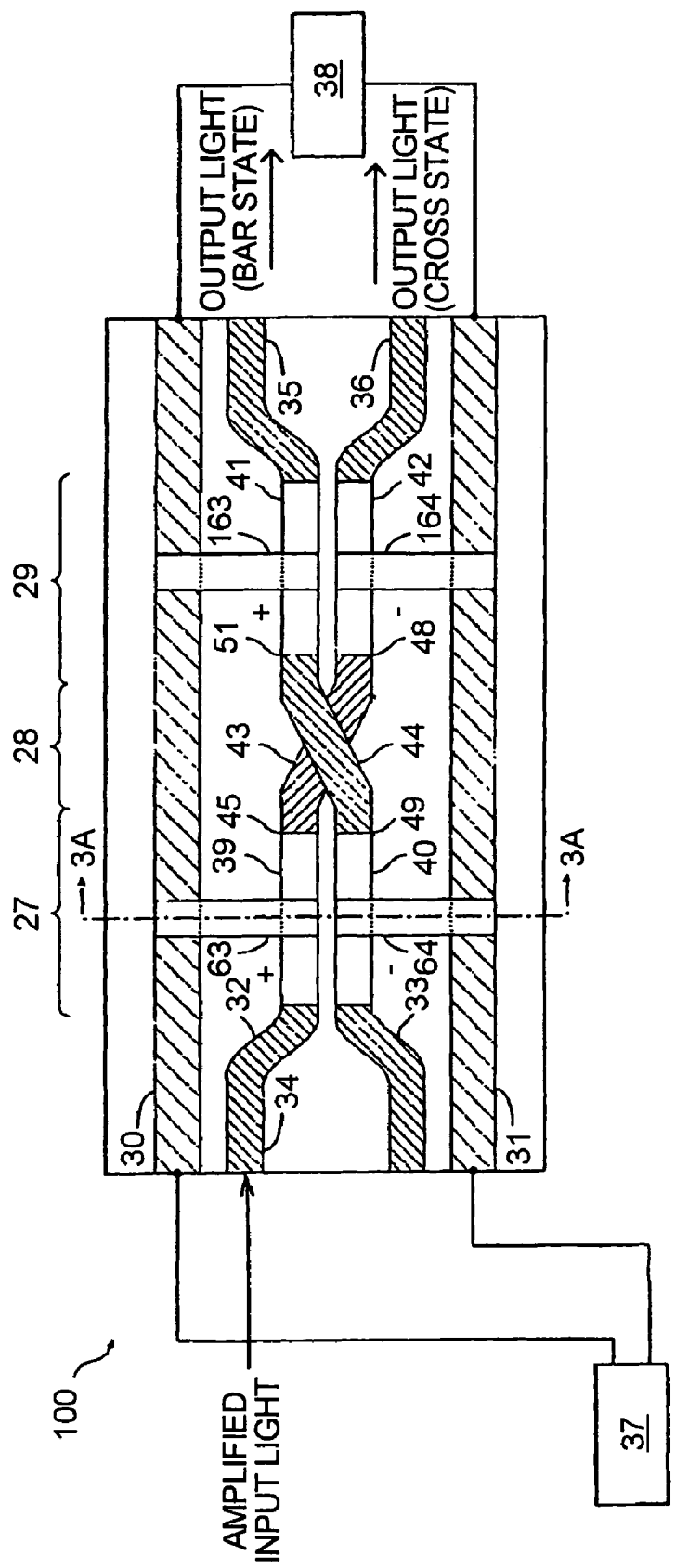
FIG. 5 a plan view of a directional coupler modulator.
Figure 6:
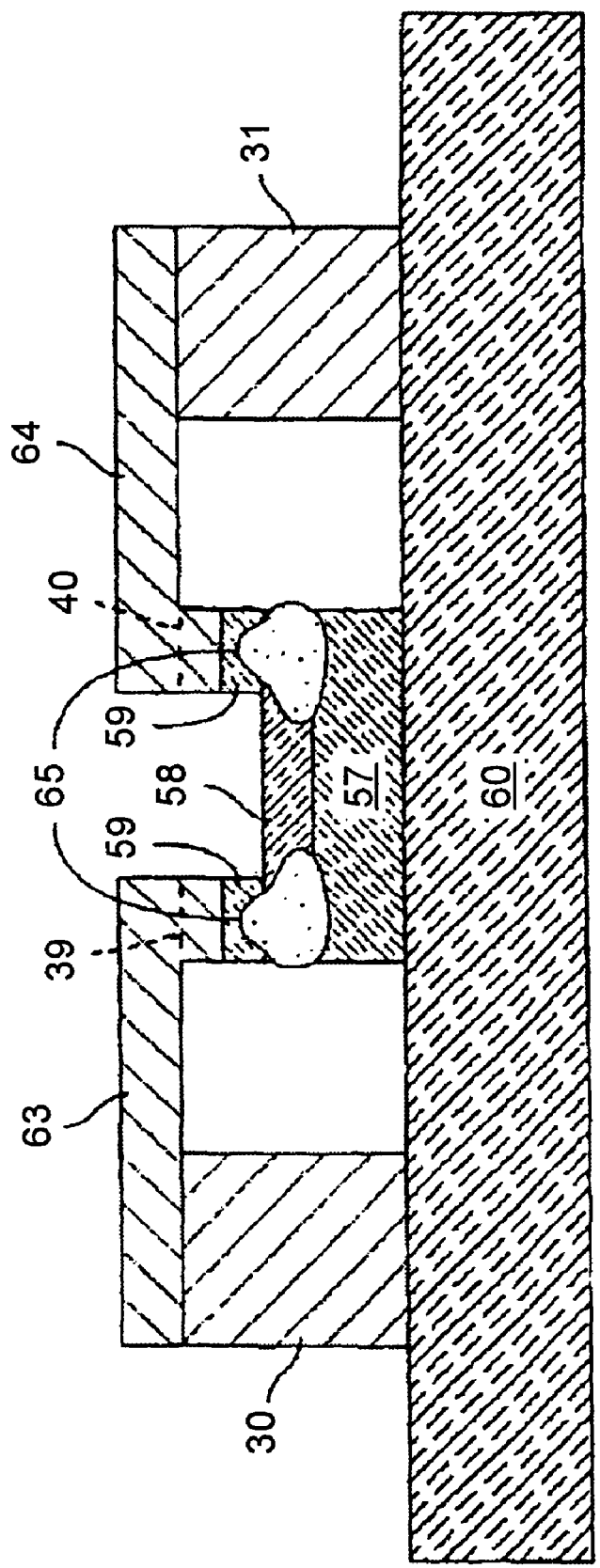
FIG. 6 is a cross section taken along line 3A-3A in FIG. 5.

FIG. 5 is a plan view of a directional coupler modulator 100 as still another specific example of the optical device 430. FIG. 6 is a cross section taken along line 3A-3A in FIG. 5.

The optical modulator formed of optical waveguides 32, 33 includes a section defined as a first directional coupler 27, a section defined as a cross waveguide 28 and a section defined as a second directional coupler 29. Each directional coupler is of the delta beta type having two waveguides with a specific desired coupling length. The two optical waveguides 32, 33 cross one another at central segments 43, 44 corresponding to the cross waveguide 28 as shown in FIG. 5. Specifically, the upper output port at 45 of the first directional coupler 27 is connected to the lower input port at 48 of the second directional coupler 29. Similarly, the lower output port of the first directional coupler 27 at 49 is connected to the upper input port at 51 of the second directional coupler 29. In this central region, the two waveguide segments 43, 44 do not work as a directional coupler. The traveling-wave electrodes 30, 31 do not have any bending or crossing. The two traveling-wave electrodes 30, 31 are connected directly with no loss. The first directional coupler 27 has electrodes 39 and 40, the second directional coupler 29 has electrodes 41 and 42.

The optical directional modulator 100 can control both cross and bar states by an input voltage signal like a conventional reverse delta beta type directional coupler modulator. There is no need to use two input signals with opposite polarities. It should also be noted that the invention allows for one input signal drive and a traveling-wave electrode configuration.

The optical directional modulator 100 operates as follows. With transmission, an electric field is applied to the electrodes 39, 40, 41, 42 on the directional coupler waveguide through a set of air-bridges 63, 64, 163, 164 to attain a delta-beta operational mode. However, in this state, the polarities of the first and second directional coupler modulators are the same (which differs from the conventional reverse delta-beta type directional coupler modulator). When the total length of the first and second directional coupler is larger than the coupling length of the directional coupler and shorter than three times the coupling length, path switching can be achieved effectively. At the bias voltage of Vb for low phase mismatches, the input light of an upper waveguide 34 is split into the upper and lower waveguides at the end of the first directional coupler, each with 50% input power. By adopting a cross waveguide 28 showed in FIG. 5, electrical signal polarities of the first and second directional coupler 27, 29 can be kept the same. This invention eliminates RF signal crossing, and improves RF performance. In the present modulator, the output light moves only in the upper waveguide 35 at the bias voltage of Vb. On the other hand, when the bias voltage is Vc, the input light of an upper waveguide 34 returns only to the upper waveguide at the end of the first directional coupler because of a larger phase mismatch. After propagation of light in the crossing waveguide, the light propagates into the lower waveguide of the second directional coupler. In the second directional coupler, the bias voltage of Vc is also applied as shown in FIG. 5. Then the output light at the end of the second directional coupler returns to the lower waveguide 36. Accordingly both bar and cross states can be controlled completely by signal voltages with a wide fabrication tolerance of the structural parameters.

It is preferable that, the lengths of the electrodes 39, 40, 41, 42 as shown in FIG. 5 must be shorter than the wavelength of the electrical signal through the traveling-wave electrodes 30, 31, because longer electrodes seriously affect the traveling-wave characteristics and induce a large amount of transmission loss.

Figure 7:
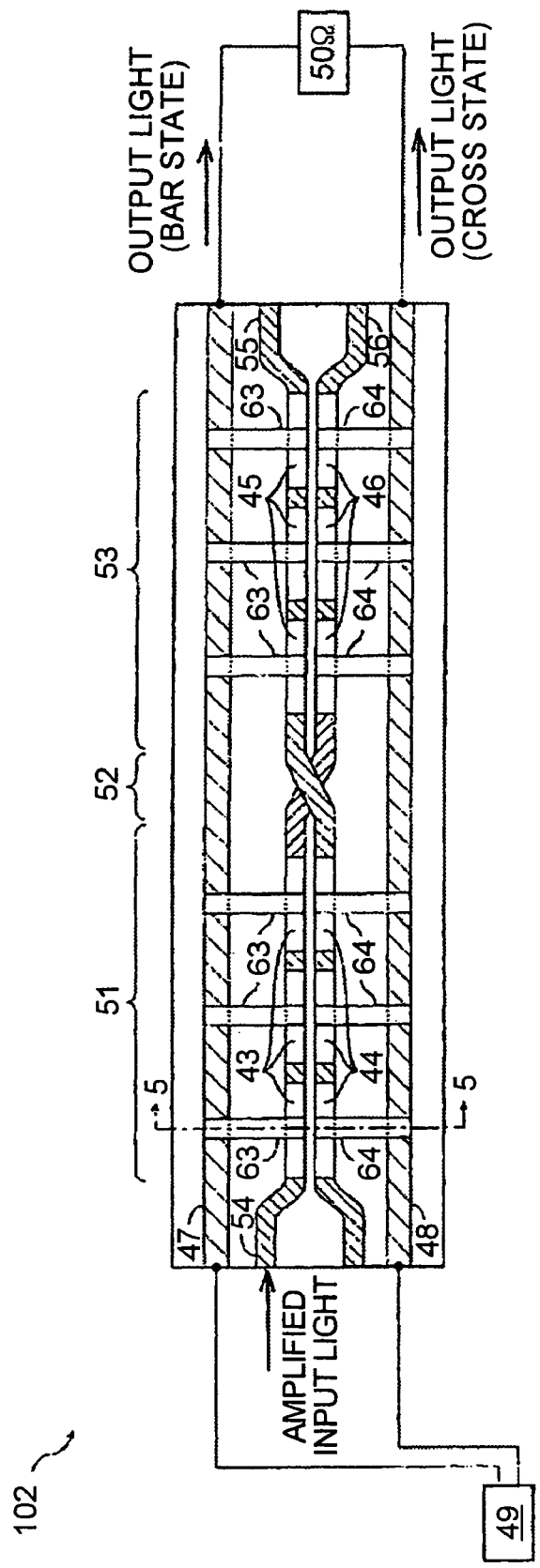
FIG. 7 is a plan view of another directional coupler modulator.

FIG. 7 is a plan view of a directional coupler modulator 102, which solves such a problem, as another specific example of the optical device 430.

The electrodes are divided and electrically connected to each directional coupler as shown in the figure as two sets of triple segments 43, 44 and 45, 46. Each electrode segment is connected to outer traveling-wave electrode strips 47, 48 independently through an air-bridge 63, 64.

An electrical drive signal from the signal generator 49 is applied to the input port of each of the traveling-wave electrodes 47, 48 and then is propagated to each electrode 43, 44, 45, 46 through the respective traveling-wave electrode 47, 48 and the air-bridge 63, 64. The electrical signal is terminated by a load resistance 50.

The optical waveguide topology is the same as in FIG. 5. The first directional coupler 51, the cross waveguide region 52, and the second directional coupler 53 are cascade connected.

Thus, incident light coupled to the input waveguide 54 is switched to the output waveguide 55 or 56 by the input signal voltage.

This configuration leads to a low loss electrical transmission where the modulator is long compared to the wavelength of the signal of interest. Input impedance can be maintained to a desired value (typically 50 ohm) even for a longer modulator, based on a similar configuration.

Figure 8:
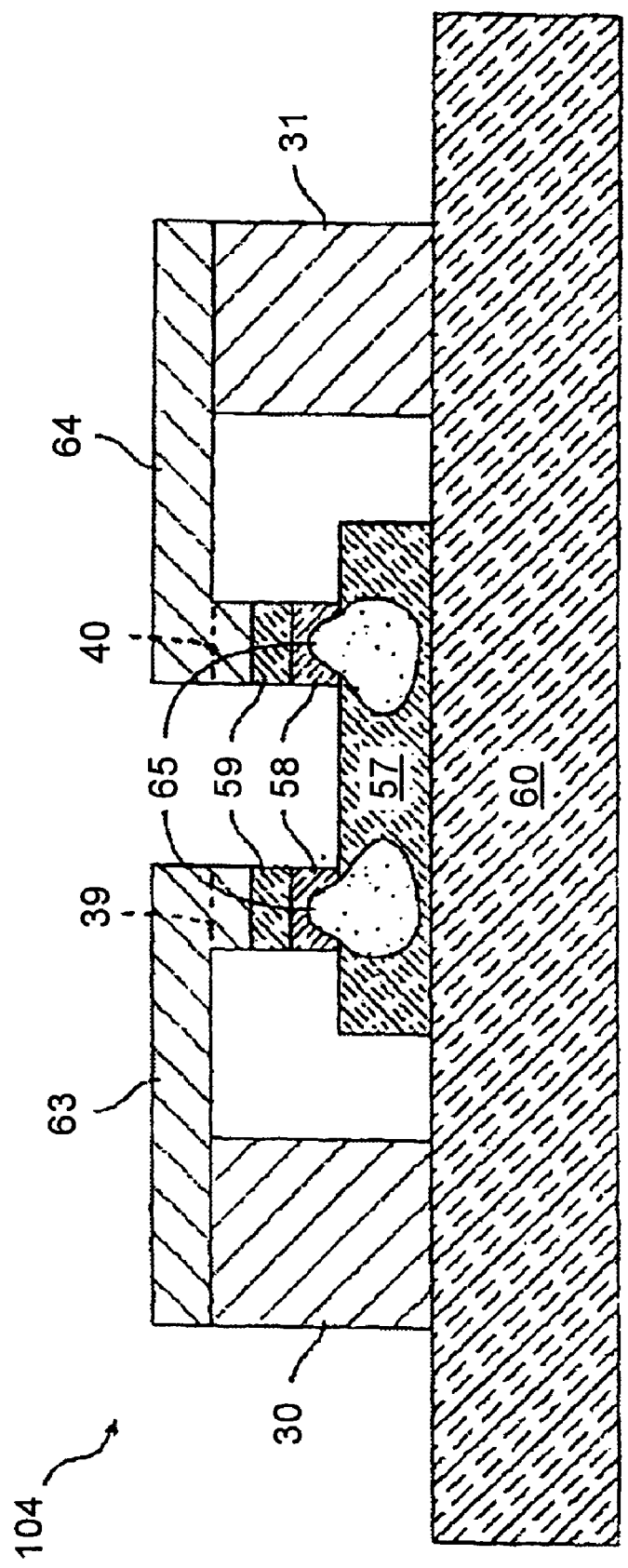
FIG. 8 illustrates a cross section of still another directional coupler modulator.
Figure 9:
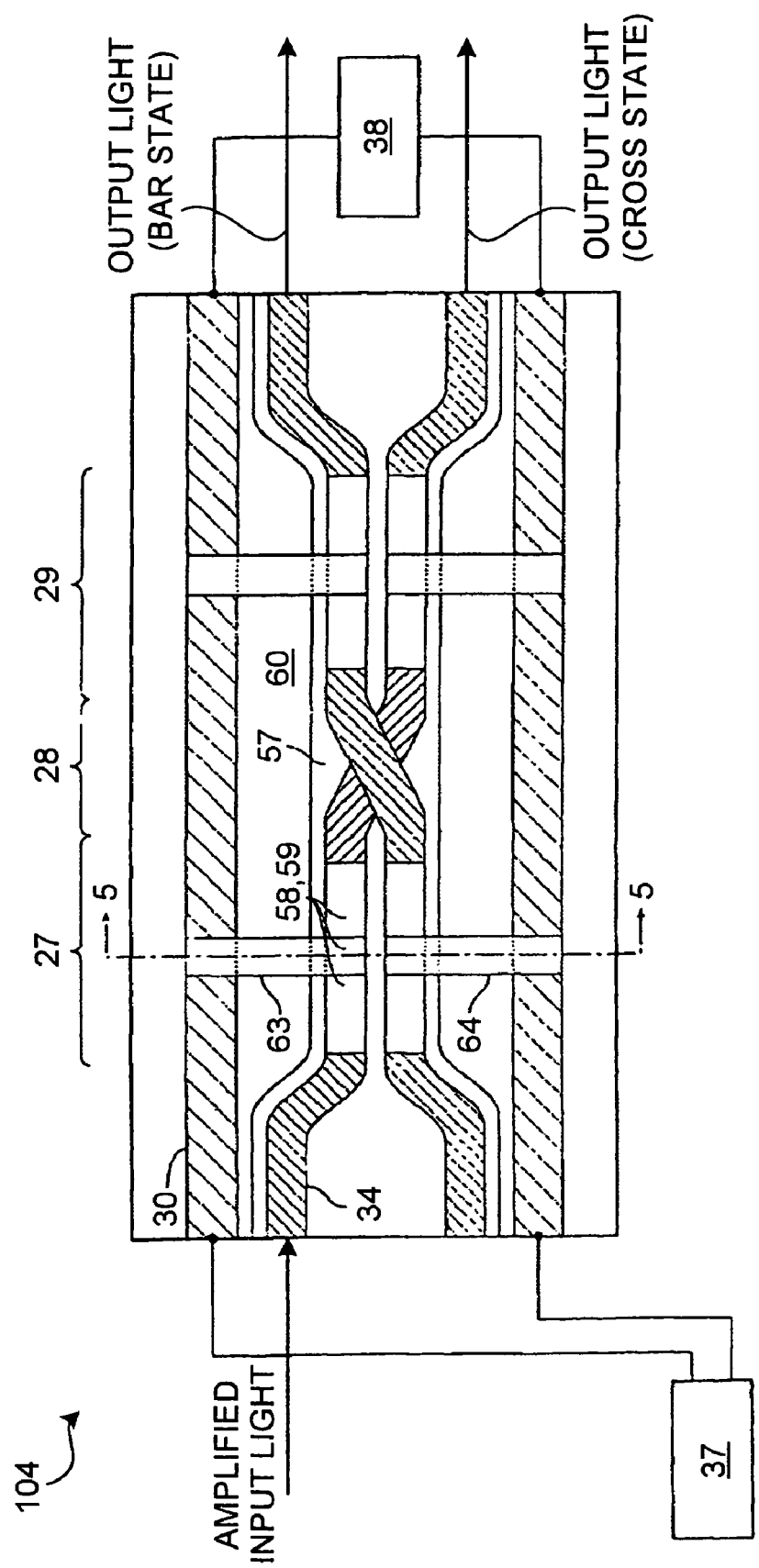
FIG. 9 is a plan view of the directional coupler modulator in FIG. 8.

FIG. 8 is a cross section of a directional coupler modulator 104 as still another specific example of the optical device 430. FIG. 9 is a plan view of the directional coupler modulator in FIG. 8.

The optical waveguide employs a ridge waveguide structure. An N-cladding layer 57, an intrinsic core (hereinafter, "I-core") layer 58, and a P-cladding layer 59 which serves as an electrode are disposed on a substrate 60. The electrical signals are fed from the traveling-wave electrodes 30, 31 through air bridges 63, 64 to the P-cladding layer. The air bridge structure allows the drive voltage to be minimized by keeping the electric field well confined within the I-type region, and the N-type layer is preferably kept completely floating to both the outer electrodes for DC-bias. The electrode is separated from the N-type layer and is coupled directly to the P-type layer. Although an insulating layer could be used instead of an air bridge, the thickness would need to be much greater than is suited to the selected semiconductor fabrication process. For this reason the air bridge structure is preferred. The optical beams represented by regions 65 are confined in the I-core layer 58 by the higher refractive index in the structure of layer 58, but they can couple with the adjacent waveguide through the N-cladding layer 57. On the other hand, a microwave signal from the traveling-wave electrodes 30, 31 fed by the air-bridges 63, 64 is concentrated only in the I-core layer 58 of each waveguide by the P-I-N structure. Thus, an overlap between the optical intensity and microwave signal intensity in the I-core layer increases and reduces the drive voltage as the coupling length is adjusted.

Figure 10:
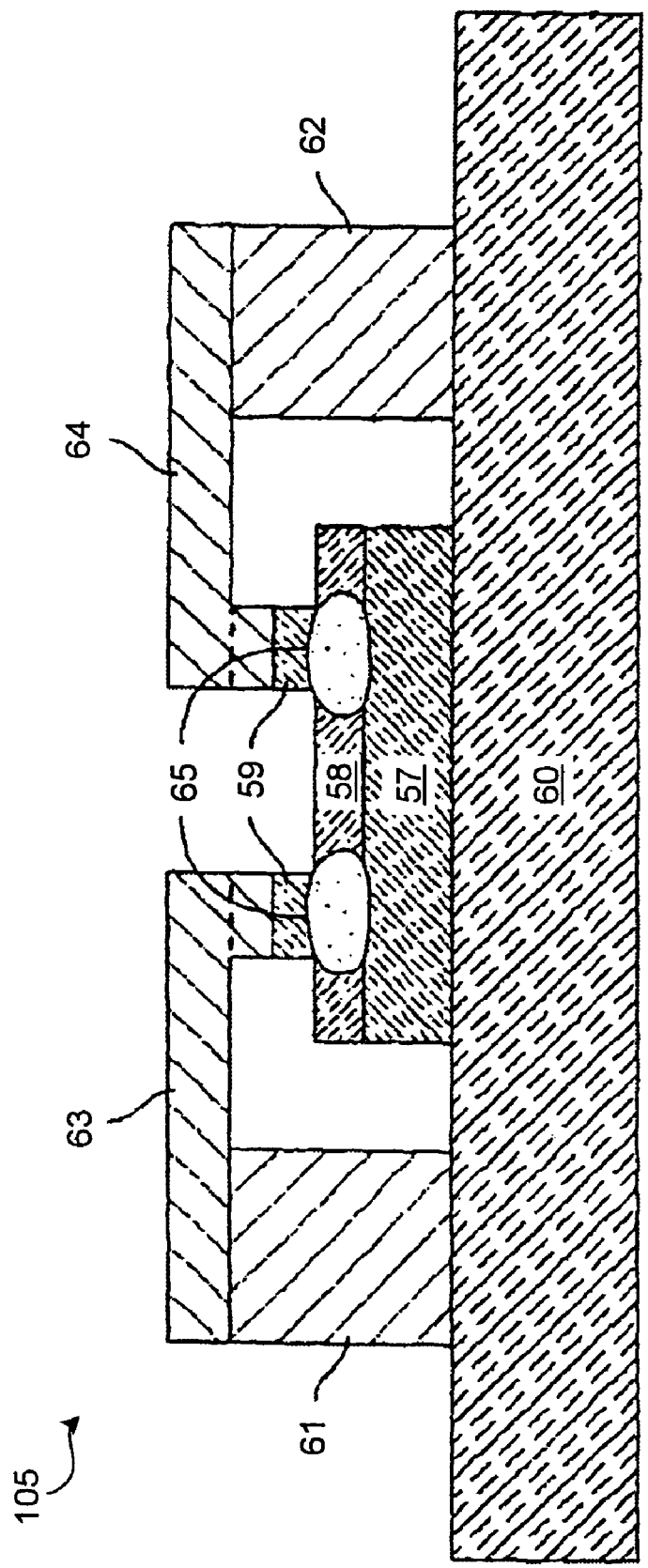
FIG. 10 illustrates a cross section of still another directional coupler modulator.

FIG. 10 is a modification of the structure of FIG. 8 in a further embodiment in which there is no ridge structure.

The ridgeless structure involves a common I-core layer 58 extends across and upon the common N-cladding layer 57. Removal of the portion of the I-core layer 58 between the bridges is not necessary. Furthermore, the optical coupling occurs directly in this layer. It is to be noted that the coupling strength between the two waveguides can be specified by defining the separation between the two waveguides. Optical confinement in the I-core layer 58 can be kept quite large.

Figure 11:
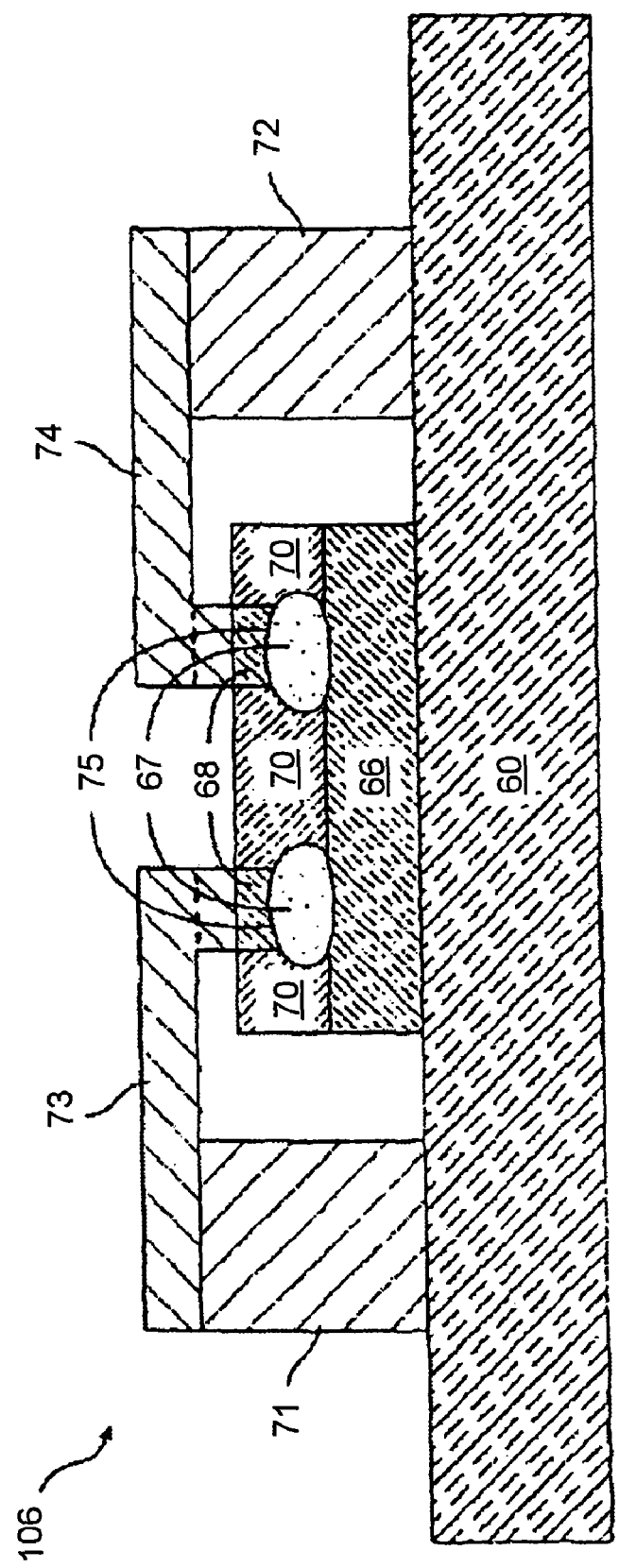
FIG. 11 illustrates a cross section of still another directional coupler modulator.

FIG. 11 is a cross section a directional coupler modulator 106 as still another specific example of the optical device 430.

The directional coupler modulator 106 has a buried-heterostructure (BH) waveguide structure. An N-cladding layer 66, an I-core layer 67 and a P-cladding layer 68 are deposited on the substrate 60. The side regions of the I-core layer are completely buried by a semi-insulating cladding layer 70. The electrical signals are fed from the traveling-wave electrodes 71, 72 through the air-bridges 73, 74. The optical beam represented by regions 75 is confined in the I-core layer 67 by the higher refractive index in the structure 67, and it can couple with the adjacent waveguide through the semi-insulating buried cladding layer 70.

On the other hand, a microwave signal from the traveling-wave electrodes 71, 72 fed by the air bridges 73, 74 concentrate only in the I-core layer 67 of each waveguide by the P-I-N structure and buried layers. Thus, an overlap between the optical intensity and micro-wave signal intensity in the I-core layer increases and reduces the drive voltage while the coupling length is adjusted by changing the separation of the pair of optical waveguides.

Compared with the ridge waveguide structure, the BH optical waveguide structure is more complicated, but it exhibits optically a lower insertion loss due to tight light confinement.

Figure 12:
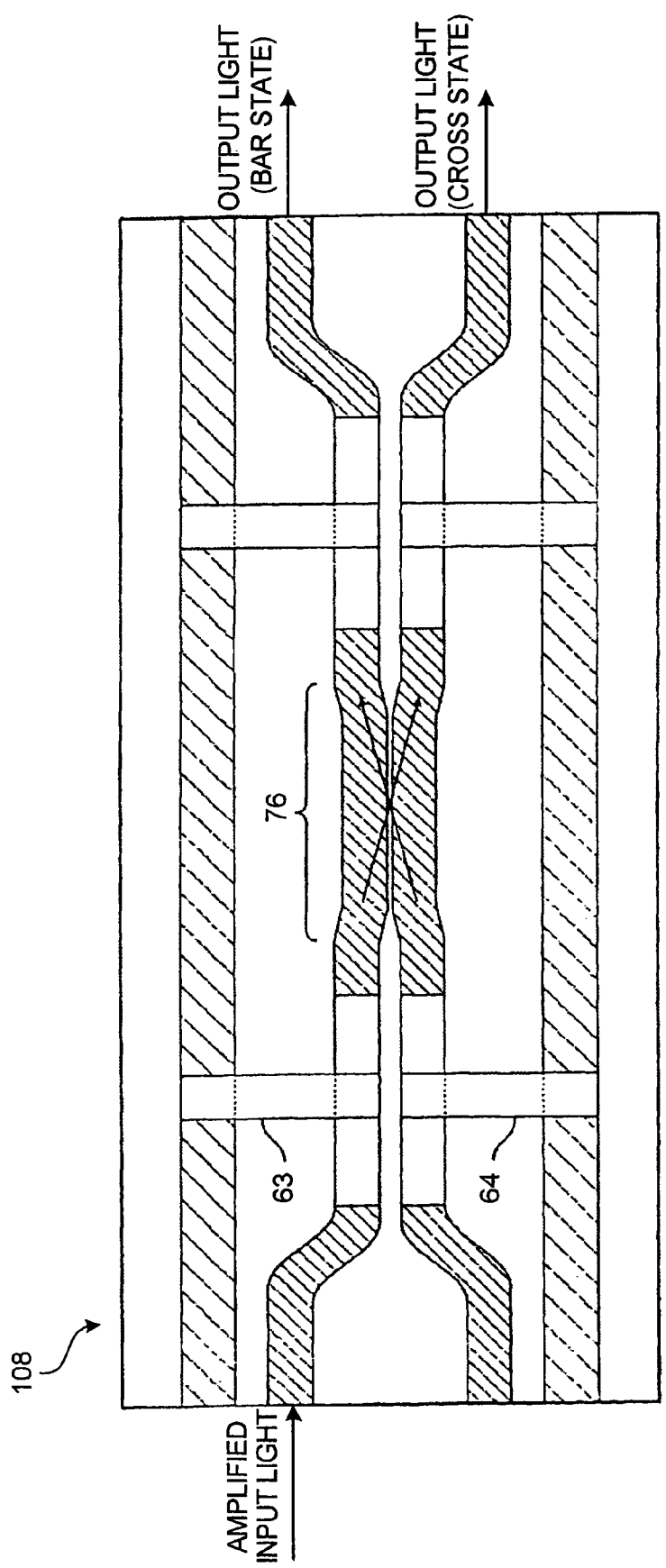
FIG. 12 is a plan view of still another directional coupler modulator.

FIG. 12 is plan view of a directional coupler modulator 108 as still another specific example of the optical device 430. A cross-state directional coupler 76 is used instead of an actually crossing optical waveguide, as an optical cross waveguide. The arrow in the figure indicates the cross state. The cross-state directional coupler 76 is constituted of a pair of optical waveguides arranged in parallel with and close to each other, so as to generate cross-state directional coupling.

It is noted that the separation of the pair of waveguide segments is reduced compared to the waveguides in the first or second directional coupler regions. This structure leads to a shorter coupling length and provides a more compact modulator.

Figure 13:
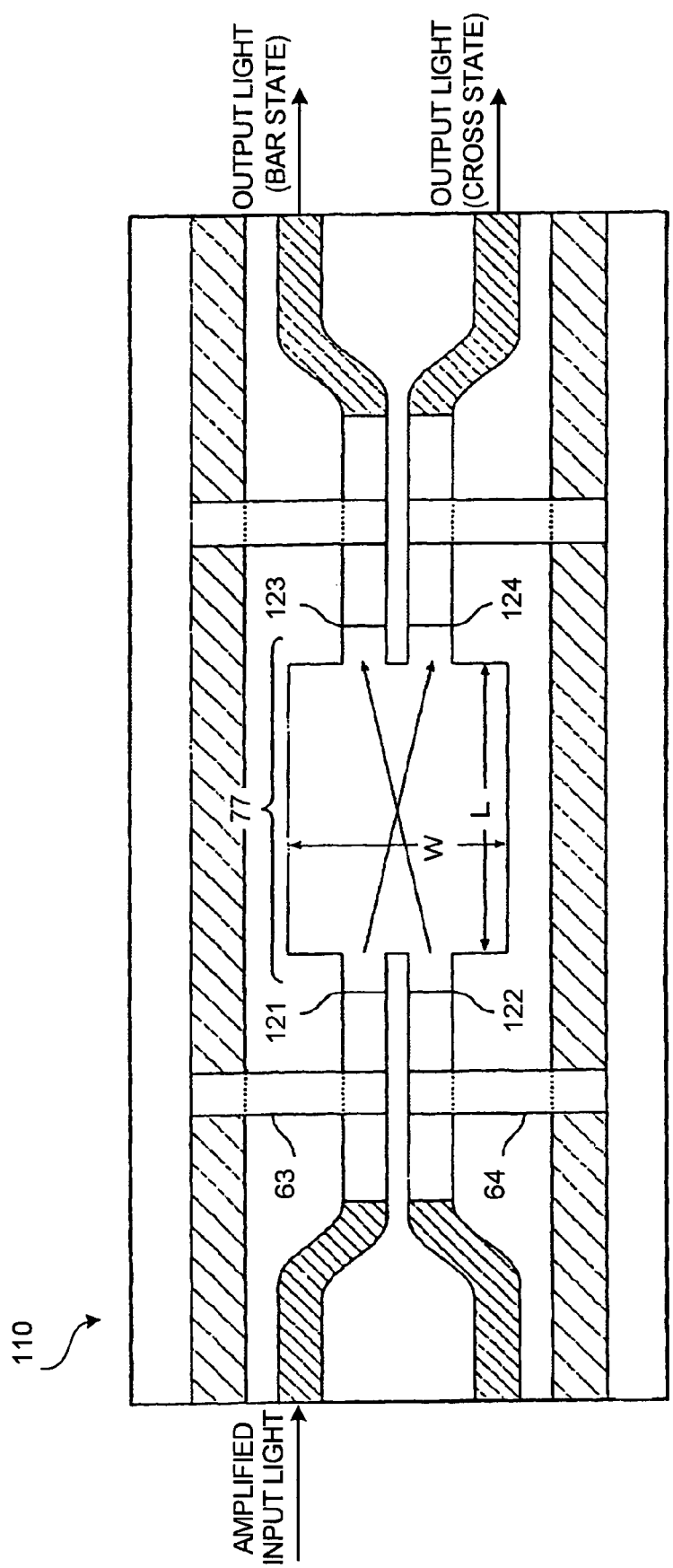
FIG. 13 is a plan view of still another directional coupler modulator.

FIG. 13 is a plan view of a directional coupler modulator 110 as still another specific example of the optical device 430. A 2×2 Multi-Mode-Interference (MMI) coupler 77 is employed with two input ports 121, 122 and two output ports 123, 124. By choosing a width W and a length L for the 2×2 MMI coupler 77, mirrored images can be obtained at opposite waveguides as described by Dr. L. B. Soldano et al., "Optical Multi-Mode Interference Devices Based on Self-Imaging: Principles and Applications" Journal of Lightwave Technology, vol. 13, No. 4, pp. 615-627, April 1995. Thus using the same layered structure of the directional coupler region, a simple crossover waveguide can be built into a chip.

Figure 14:
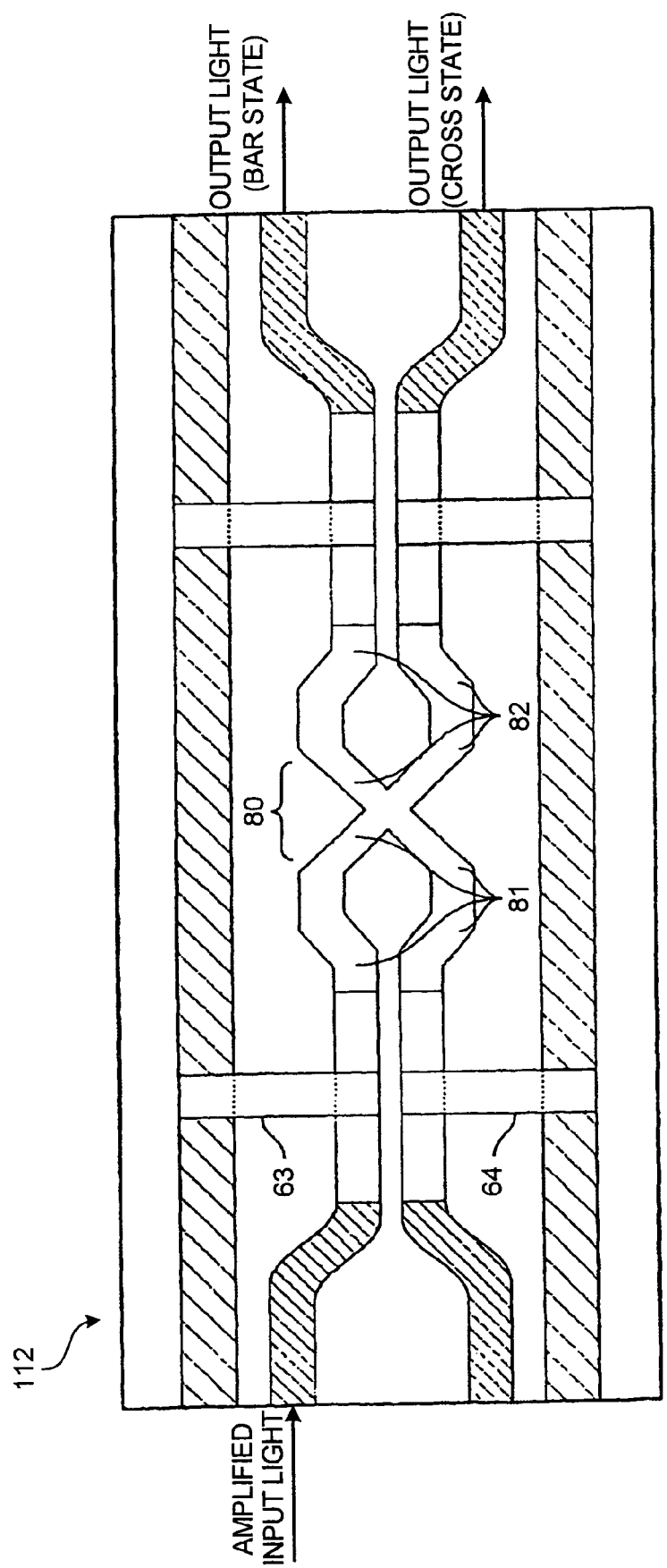
FIG. 14 is a plan view of still another directional coupler modulator.

FIG. 14 is a plan view of a directional coupler modulator 112 as still another specific example of the optical device 430.

A simple X type cross waveguide 80 and bending waveguides 81, 82 are used in the coupling region. In this structure, a wavelength independent cross waveguide is obtained using a relatively simple structure, since it is not necessary to control precisely the waveguide structural parameters required for directional couplers and 2×2 MMI couplers.

Figure 15:
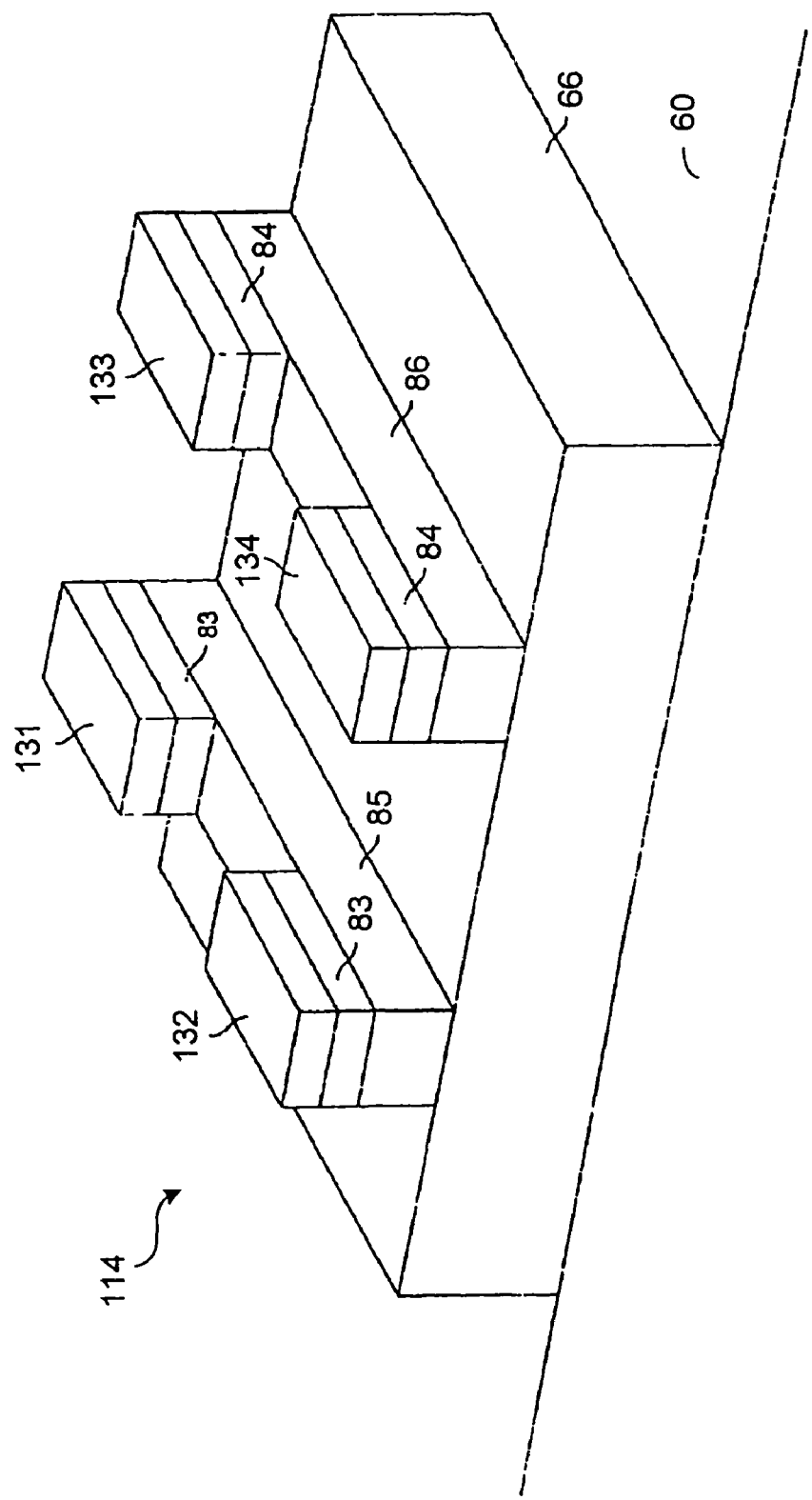
FIG. 15 is a perspective of still another directional coupler modulator.

FIG. 15 is a perspective (not to the scale) of a directional coupler modulator 114 as still another specific example of the optical device 430. Traveling-wave transmission is significantly affected by the interaction of each electrode on the optical waveguide. To maintain good traveling-wave transmission characteristics, one can eliminate the interaction of those electrodes. When the isolation is not enough, the backward transmission is easily induced and degrades the electrical return loss. This suggests that each electrode should be isolated electrically.

P-clad layers 83, 84 are disposed only under electrodes 131, 132, 133, 134. Undesired P-clad layer material between the electrodes on the optical waveguide is removed. Thus the current between the electrodes is well suppressed. As a result, the interaction otherwise originated by such a leakage current is avoided.

On the other hand, an optical beam in I-core layers 85 and 86 and the N-cladding 66 on the substrate 60 can propagate in this region without a large optical loss.

Figure 16:
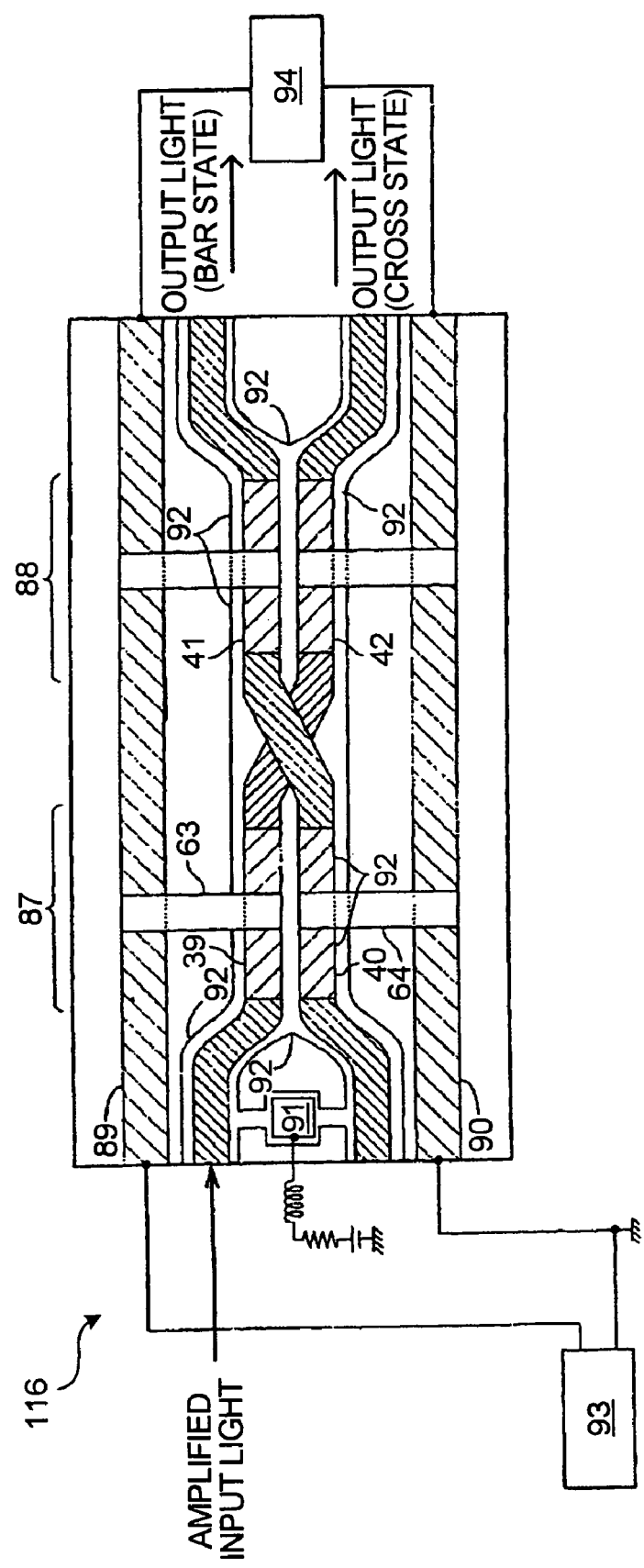
FIG. 16 is a plan view of still another directional coupler modulator.

FIG. 16 is a plan view of a directional coupler modulator 116 as still another specific example of the optical device 430.

It is necessary to provide two directional couplers 87, 88 to operate as a delta-beta switched directional coupler. In each directional coupler, the magnitude of the refractive change of the waveguides should be the same and the polarity should be opposite. Thus the change in the electric field of the electro-optic I-core layer (not shown) should be controlled to obtain desired refractive index changes.

The change in the electric field can be induced by the electrodes 39, 40, 41, 42 connected to outer traveling-wave electrodes 89, 90. However, the directional coupler modulator 116 is based on a P-I-N semiconductor structure and has a diode characteristic.

A bias electrode 91 is deposited on an N+ electrode layer 92, and this N+ electrode layer 92 is also disposed below the whole optical waveguide. Therefore, the bias electrode 91 causes all waveguides to be in a negative bias region of a diode characteristic during the modulation mode. It should be noted that the voltage applied from the bias electrode is half of the RF input signal from the signal generator 93 for the negative bias condition.

Figure 17:
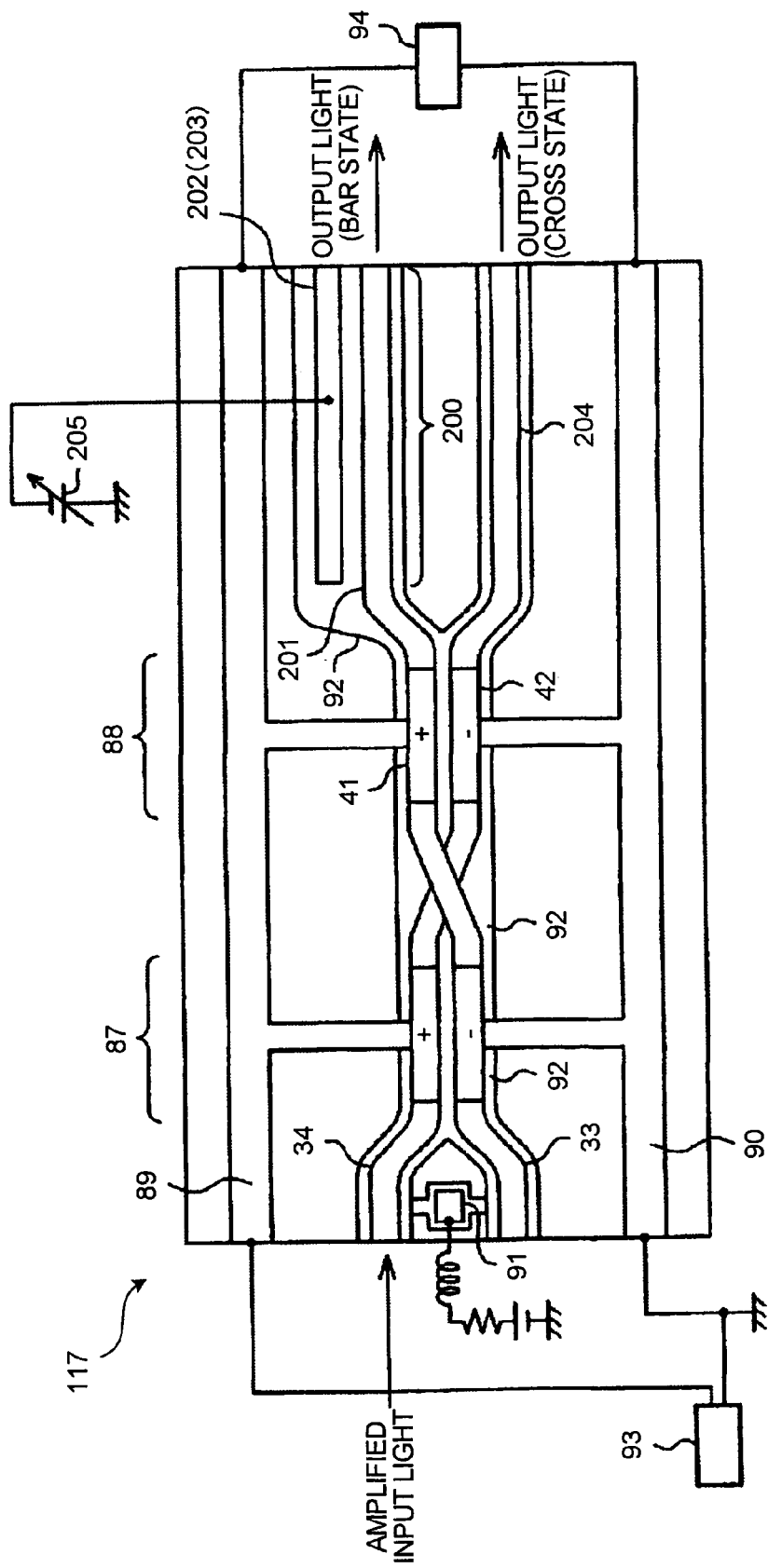
FIG. 17 is a plan view of still another directional coupler modulator.

FIG. 17 is a plan view of a directional coupler modulator 117 as still another specific example of the optical device 430.

The directional coupler modulator 117 includes an attenuator 200 on an output side of the structure shown in FIG. 16.

The attenuator 200 includes optical waveguides 201, 202, electrode 203 deposited on a P-layer (not shown) of the optical waveguide 202, and the N+ electrode layer deposited below the optical waveguides 201, 202. A variable DC power source 205 applies a voltage to the electrode 203. The length of the optical waveguide 202 is, for example, an even multiple of coupling length ($=\pi/(2\kappa)$).

When the voltage between the N+ electrode and the electrode 203 is 0 volt, the light that propagates through the optical waveguide 201 is output as it is. However, when the voltage is other than 0 volt, a portion of the light that propagates through the optical waveguide 201 is output from the optical waveguide 202. In other words, when the voltage is other than 0 volt, the light output from the optical waveguide 201 is attenuated. The amount of attenuation depends on the voltage applied to the electrode 203. The voltage is applied in such a manner that the light output from the optical waveguide 201 suits with the requirement of the optical communications system (not shown) connected to the wavelength guide 201.

Since the electrode 203 is separated from the optical waveguide 201, it does not cause any bad effect of the electrode 41. In other words, the directional coupler modulator 117 has good modulation characteristics.

The length of the optical waveguide 202 may be an odd multiple of coupling length. Moreover, as the light output can be controlled by controlling the voltage, the length of the optical waveguide 202 need not be an integer multiple of coupling length. Moreover, light may be output from the optical waveguide 202 instead of the optical waveguide 201. Furthermore, FIG. 17 illustrates that the electrode 203 is provided in the top side but it may be provided on the bottom side. Moreover, light may be output from an optical waveguide 204, which is continuation of the optical waveguide 33, instead of the optical waveguide 201. Furthermore, the attenuator 200 may be provided on an input side of the structure shown in FIG. 16. According to the structure shown in FIG. 16, users can obtain two chirp parameters from one output port by simply changing the DC voltage.

As explained above, according to the first embodiment, the light input from the optical fiber 301 is amplified by the semiconductor optical amplifying section 410, the amplified light is allowed to propagate and be output from the optical device 430 to the optical fiber 302. As a result, an insertion loss with respect to the optical transmission path (optical fiber) can be reduced.

Moreover, a DC current in the reverse direction or a DC current in the forward direction and not larger than a predetermined value is injected by the DC control section 421 (see FIG. 2), to control the optical attenuation. Therefore, the optical module of the present invention can also serve as a valuable optical attenuator or an optical shutter.

Figure 18:
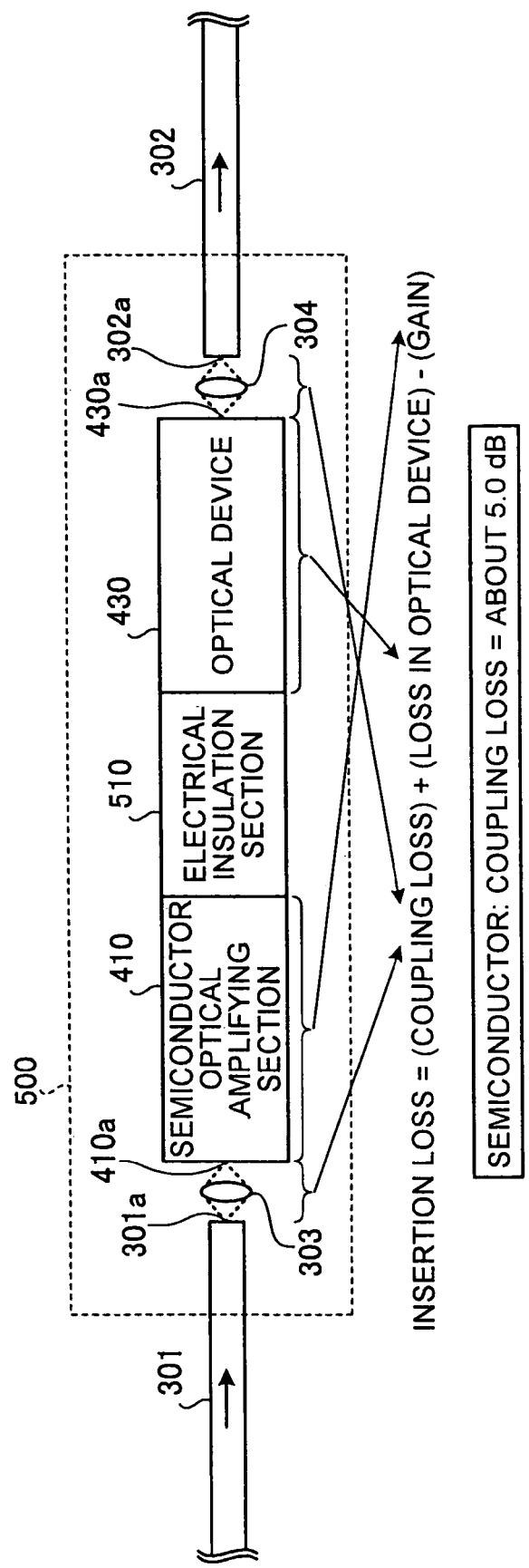
FIG. 18 illustrates an optical communication system according to a second embodiment of the present invention.

FIG. 18 illustrates an optical communication system according to a second embodiment of the present invention. In this figure, those parts that perform same or similar functions or have same or similar configuration as the parts shown in FIG. 1 have been provided with like reference signs. Thus, the optical communication system according to a second embodiment is different from the conventional optical communication system according to the first embodiment in that it includes an optical module 500 instead of the optical module 400.

The optical module 500 includes an electrical insulator 510 between the semiconductor optical amplifying section 410 and the optical device 430. The electrical insulator 510 electrically insulates but optically couples the semiconductor optical amplifying section 410 and the optical device 430.

Figure 19:
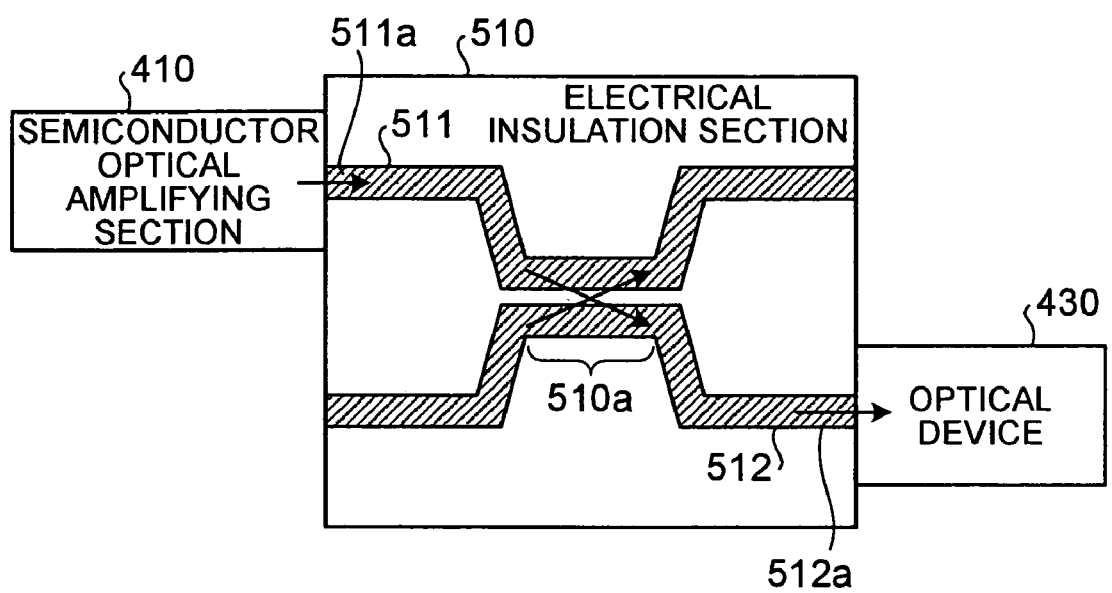
FIG. 19 is a plan view of an electrical insulator.

FIG. 19 is a plan view of the electrical insulator 510. The electrical insulator 510 includes a pair of optical waveguides 511 and 512 arranged in parallel with each other. The optical waveguide portion, in which the pair of optical waveguides is arranged in parallel with and close to each other so as to generate cross-state directional coupling, is a cross-state directional coupler 510a.

The light amplified by the semiconductor optical amplifying section 410 is input to an input end 511a of the optical waveguide 511, propagates through the optical waveguide 511, crosses at the cross-state directional coupler 510a, and propagates through the optical waveguide 512. The light output from an output end 512a of the optical waveguide 512 is input to the optical device 430.

In the optical module according to the second embodiment, the electrical insulator 510 electrically insulates but optically couples the semiconductor optical amplifying section 410 and the optical device 430. Therefore, stable control can be performed independently with respect to the semiconductor optical amplifying section 410 and the optical device 430.

The configuration of the semiconductor optical amplifying section 410 is not limited to that shown in FIG. 2. Any other configuration that can achieve similar optical amplification (optical attenuation) may be even be employed.

According to the present invention, insertion loss of the optical transmission path can be reduced and the optical communications can be performed at higher speed. Moreover, the optical module can even posses a valuable optical attenuator or an optical shutter, the optical module can be manufactured with simpler method, and the optical module is small and compact. Moreover, leakage of current can be suppressed, and hence the interaction originated by such a leakage current can be avoided. The optical module can be used as a variable optical attenuator that attenuates light by a change of the refractive index, stable control can be performed independently with respect to the optical amplifying section and the optical device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module arranged in an optical transmission path, comprising:

an optical amplifying unit configured with a semiconductor, wherein the optical amplifying unit amplifies in high gain light input from the optical transmission path; and an optical element configured with a semiconductor, wherein the optical element includes an optical modulator, disposed in series with and behind the optical amplifying unit, and propagates the light amplified by the optical amplifying unit to the optical transmission path, and is operative to produce gain sufficiently high that insertion loss of the optical module is completely compensated, wherein the optical element comprises:

a first optical waveguide through which light from the optical amplifying unit propagates;

a second optical waveguide through which light propagates, wherein the second optical waveguide optically crosses the first optical waveguide to form a crossing portion;

a first lead electrode arranged along the first optical waveguide and the second optical waveguide;

a pair of first control electrodes arranged along the first optical waveguide so as to face each other, with the crossing portion therebetween, to which a control voltage controlling a crossing state is applied via the first lead electrode;

a second lead electrode arranged so as to face the first lead electrode; and a pair of second control electrodes arranged along the second optical waveguide so as to face each other, with the crossing portion therebetween, to which the control voltage is applied via the second lead electrode.

2. The optical module according to claim 1, wherein the first lead electrode and the second lead electrode are arranged so as to face each other, with the first optical waveguide and the second optical waveguide arranged therebetween.

3. The optical module according to claim 2, wherein the first lead electrode and the second lead electrode are arranged substantially parallel with each other.

4. The optical module according to claim 1, wherein the first optical waveguide and the second optical waveguide are arranged in a physically solid crossing state.

5. The optical module according to claim 1, wherein each of the first control electrodes and the second control electrodes have a control electrode piece divided into a plurality of parts in the longitudinal direction.

6. The optical module according to claim 5, wherein each of the first optical waveguide and the second optical waveguide has a PIN structure in which an I-core layer is put between a P-cladding layer and an N-cladding layer, in regions other than the regions immediately below the control electrode pieces, which are adjacent to each other in the longitudinal direction, wherein corresponding control electrode piece is deposited on the P-layer,
the optical waveguide immediately below a region between the control electrode pieces adjacent to each other in the longitudinal direction has a structure in which the P-layer is removed from the PIN structure, and
the N-layer in the PIN structure is a common layer to the first optical waveguide and the second optical waveguide.

7. The optical module according to claim 1, wherein each of the first optical waveguide and the second optical waveguide has the PIN structure of a three-layer type or an I-layer buried type, wherein in the case of the three-layer type, the first control electrode and the second control electrode are deposited respectively on the P-layer of the first optical waveguide and the second optical waveguide, and in the case of the I-layer buried type, the first control electrode and the second control electrode are deposited respectively on the I-layer of the first optical waveguide and the second optical waveguide, N-layer of the first optical waveguide and the second optical waveguide are deposited, and the first optical waveguide and the second optical waveguide have a common N+ layer to which a DC bias voltage is applied.

8. An optical module arranged in an optical transmission path, comprising:
an optical amplifying unit configured with a semiconductor;
an optical element configured with a semiconductor,
wherein the optical element includes an optical modulator disposed in series with the optical amplifying unit and propagates the light amplified by the optical amplifying unit to the optical transmission path;
a controller configured to inject a dc current into the optical amplifying unit,
wherein the optical amplifying unit amplifies in a high gain light input from the optical transmission path, and the optical element is operative to produce gain sufficiently high that insertion loss of the optical module is completely compensated when the controller injects the dc current more than a predetermined dc current in a forward direction; and wherein
the optical element comprises:
a first optical waveguide through which light from the optical amplifying unit propagates;
a second optical waveguide through which light propagates, wherein the second optical waveguide optically crosses the first optical waveguide to form a crossing portion;
a first lead electrode arranged along the first optical waveguide and the second optical waveguide;
a pair of first control electrodes arranged along the first optical waveguide so as to face each other, with the crossing portion therebetween, to which a control voltage controlling a crossing state is applied via the first lead electrode;
a second lead electrode arranged so as to face the first lead electrode; and
a pair of second control electrodes arranged along the second optical waveguide so as to face each other, with the crossing portion therebetween, to which the control voltage is applied via the second lead electrode.

9. The optical module according to claim 8, wherein the first lead electrode and the second lead electrode are arranged so as to face each other, with the first optical waveguide and the second optical waveguide arranged therebetween.

10. The optical module according to claim 9, wherein the first lead electrode and the second lead electrode are arranged substantially parallel with each other.

11. The optical module according to claim 8, wherein the first optical waveguide and the second optical waveguide are arranged in a physically solid crossing state.

12. The optical module according to claim 8, wherein each of the first control electrodes and the second control electrodes have a control electrode piece divided into a plurality of parts in the longitudinal direction.

13. The optical module according to claim 12, wherein each of the first optical waveguide and the second optical waveguide has a PIN structure in which an I-core layer is put between a P-cladding layer and an N-cladding layer, in regions other than the regions immediately below the control electrode pieces, which are adjacent to each other in the longitudinal direction, wherein corresponding control electrode piece is deposited on the P-layer,
the optical waveguide immediately below a region between the control electrode pieces adjacent to each other in the longitudinal direction has a structure in which the P-layer is removed from the PIN structure, and
the N-layer in the PIN structure is a common layer to the first optical waveguide and the second optical waveguide.

14. The optical module according to claim 8, wherein each of the first optical waveguide and the second optical waveguide has the PIN structure of a three-layer type or an I-layer buried type, wherein in the case of the three-layer type, the first control electrode and the second control electrode are deposited respectively on the P-layer of the first optical waveguide and the second optical waveguide, and in the case of the I-layer buried type, the first control electrode and the second control electrode are deposited respectively on the I-layer of the first optical waveguide and the second optical waveguide, N-layer of the first optical waveguide and the second optical waveguide are deposited, and the first optical waveguide and the second optical waveguide have a common N layer to which a DC bias voltage is applied.

15. The optical module according to claim 1, wherein the crossing portion constitutes a 2×2 multi-mode interference coupler.

16. The optical module according to claim 1, wherein the crossing portion constitutes an X crossing waveguide.

17. The optical module according to claim 1, wherein the first optical waveguide and the second optical waveguide are arranged in the crossing portion, substantially in parallel with and close to each other.

18. The optical module according to claim 17, wherein a gap between the first optical waveguide and the second optical waveguide in the crossing portion is narrower than a gap between the first optical waveguide and the second optical waveguide in portions other than the crossing portion.

19. The optical module according to claim 1, further comprising a directional-coupler-type optical attenuator having a third optical waveguide formed by extending at least one of the first optical waveguide and the second optical waveguide;

a fourth optical waveguide arranged in parallel with and close to the third optical waveguide, so that optical coupling occurs between the third optical waveguide and the fourth optical waveguide; and a third control electrode arranged along the fourth optical waveguide, to change the refractive index of the core layer by applying an electric field to the core layer in the fourth optical waveguide.

20. The optical module according to claim 8 wherein the optical amplifying unit attenuates light input from the optical transmission path when the controller injects the dc current equal to or less than that predetermined dc current in the forward direction or the dc current in a reverse direction.

* * * * *